United States Patent Office 3,352,851
Patented Nov. 14, 1967

3,352,851
α-UREIDOPENICILLINS
George Robert Fosker, Horsham, England, assignor to Beecham Group Limited, Brentford, England, a British company
No Drawing. Filed July 8, 1965, Ser. No. 470,565
Claims priority, application Great Britain, July 29, 1964, 30,693/64
3 Claims. (Cl. 260—239.1)

This invention relates to new penicillins and is particularly concerned with a new class of penicillins which are derivatives of 6-aminopenicillanic acid and which are of value as antibacterial agents, as nutritional supplements in animal food, as agents for the treatment of mastitis in cattle and as therapeutic agents in poultry and animals, including man, in the treatment especially of infectious diseases caused by Gram-positive and Gram-negative bacteria.

According to the present invention there is provided new penicillins of the general formula:

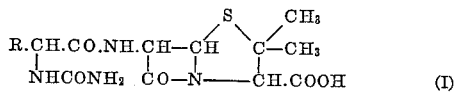

and non-toxic salts thereof, where R is a hydrogen atom or an alkyl, aralkyl, aryl or heterocyclic group which may be substituted. The salts are non-toxic salts including non-toxic metallic salts such as sodium, potassium, calcium and aluminium, ammonium and substituted ammonium salts, e.g. salts of such non-toxic amines as trialkylamines, including triethylamine, procaine, dibenzylamine, N-benzyl-betaphenethylamine, 1-ephenamine, N,N'-dibenzyl-ethylenediamine, dehydroabietylamine, N,N'-bis-dehydro-abietylethylenediamine, and other amines which have been used to form salts with benzylpenicillin.

The present invention further provides a process for the preparation of new penicillins having the general Formula I in which 6-aminopenicillanic acid or a salt thereof is coupled with an acid of the general formula:

where R is as hereinbefore defined.

The coupling of the 6-aminopenicillanic acid and the appropriate ureido acid may be effected by the use of the acid chloride or its functional equivalent as an acylating agent for a primary amino group. Such equivalents include the corresponding carboxylic acid bromides, azides, acid anhydrides and mixed anhydrides with other carboxylic acids, including monoesters and particularly lower aliphatic esters, of carbonic acid.

Alternatively, the 6-aminopenicillanic acid may be reacted with the intermediates formed from the acid (II) and a condensing agent such as dicyclohexylcarbodiimide or carbonyl-diimidazole.

In a yet further process for preparing the penicillins of the present invention the corresponding α-amino-penicillin (III) is treated with a salt of cyanic acid.

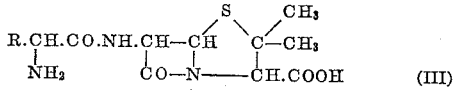

The reaction is conveniently carried out in aqueous or partly aqueous solution at a temperature between room temperature and 100°, but when the higher temperatures are employed it is preferable that the penicillin should not be exposed to them for more than a few minutes.

Thus, a preferred penicillin of the present invention, α-ureidobenzylpenicillin may be prepared by reacting α-aminobenzylpenicillin with potassium cyanate.

The novel penicillins of the present invention are mostly capable of existing in two epimeric forms and it is to be understood that the invention includes both the D- and L-forms as well as the DL-mixture.

The following examples illustrate the invention:

*Example 1.—6[D(—)α-ureidophenylacetamido] penicillanic acid*

A suspension of D(—)α-aminophenylacetic acid (30 g.) in water (250 ml.) was treated with potassium cyanate (16.2 g.) and heated at 80° with stirring until a clear solution resulted. The solution was set aside for 24 hours, then acidified with hydrochloric acid to precipitate D(—)α-ureidophenylacetic acid, which was collected, washed with water, and dried in vacuo. (Yield 36 g.). Recrystallisation from boiling water (1 l.) gave the pure acid, M.P. 203° (decomp.) $[\alpha]_D^{20}$ —136.3° (c., 1% in $N.NH_4OH$).

A stirred suspension of the above acid (1.8 g.) in dry acetone (50 ml.) containing triethylamine (1.4 ml.) was cooled to —10° and treated with ethyl chlorocarbonate (0.9 ml.). The mixture was stirred at 0° for 20 minutes whilst triethylamine hydrochloride separated and the mixed anhydride formed in solution. The suspension was then cooled to —40° and an ice-cold solution prepared from 6-aminopenicillanic acid (2 g.), water (20 ml.), acetone (20 ml.) and triethylamine (1.3 ml.) was added with vigorous stirring. The mixture was kept at 0° for 30 minutes, then allowed to stand for a further 30 minutes without external cooling. The resulting solution was clarified by extraction with ether (3× 100 ml.), only the aqueous phase being retained. The aqueous solution was acidified (pH 2) and the resulting precipitate was quickly collected, washed with cold water, and air-dried to give crude 6[D(—)α-ureidophenylacetamido]penicillanic acid (1.2 g.). The product was estimated by colorimetric assay with hydroxylamine to be about 42% pure.

*Example 2.—6[D(—)α-ureidophenylacetamido] penicillanic acid*

A suspension of 6[D(—)α-aminophenylacetamido] penicillanic acid trihydrate (4 g.) in water (30 ml.) was treated with potassium cyanate (0.8 g.) and quickly heated to 80 to 85° with stirring. The resulting clear pale yellow solution was immediately cooled to room temperature, set aside for 15 hours, then acidified with 5 N hydrochloric acid (2 ml.). The resulting crystalline product was collected, washed with cold water, and dried over potassium hydroxide in vacuo to yield the hydrated ureido penicillin (3.7 g.), M.P. 170° (decomp.). (Found: C, 47.9; H, 5.8; N, 13.0; S, 7.9. $C_{17}H_{20}N_4O_5$, $2H_2O$ requires C, 47.7; H, 5.6; N, 13.1; S, 7.5%.)

Paper chromatography of a specimen in butanol/acetic acid/water revealed a single zone of antibacterial activity with $R_F$ value different from that of the starting α-amino-benzylpenicillin, but similar to that of the product in Example 1.

*Example 3.—6[m-hydroxy(—)α-ureidophenyl-acetamido]penicillanic acid*

6[(—)α - amino - m-hydroxyphenylacetamido]penicillanic acid (7.3 g., purity 75%) was heated to 60° with an aqueous solution of potassium cyanate (1.2 g.), then cooled, set aside overnight, and acidified. The resulting slightly oily solid was collected, thoroughly washed with cold water, and dried over potassium hydroxide in vacuo. The resulting crude ureido penicillin (4.85 g.) was estimated by colorimetric assay with hydroxylamine to be about 47% pure.

Paper chromatography in butanol/acetic acid/water revealed a single zone of antibacterial activity with a different $R_F$ value from the starting amino penicillin.

Example 4.—6[m-chloro-DL-α-ureidophenyl-acetamido]penicillanic acid

This penicillin (3.45 g., purity by hydroxylamine assay 60%) was obtained by treating α-amino-m-chlorobenzylpenicillin (7.2 g., purity 40%) with potassium cyanate (1.52 g.) by the process described in Example 2. When chromatographed in butanol/acetic acid/water it had a higher $R_F$ value than the starting penicillin.

Example 5.—6[DL-α-ureido-n-valeramido]penicillanic acid

The sodium salt of α-aminobutylpenicillin (12 g., purity 57%) was dissolved in water (40 ml.), treated with 1.73 N hydrochloric acid (20 ml.), and the resulting suspension treated with potassium cyanate (3. g.). After 5 hours the clear solution was acidified and the precipitated ureidopenicillin (4.8 g.) was collected.

Colorimetric assay with hydroxylamine indicated a purity of about 34%. Paper chromatography showed a principal zone of antibacterial activity different from that of the aminopenicillin.

Example 6

Aqueous solutions or suspensions of aminomethylpenicillin, α-amino-2-furylmethylpenicillin, α-amino-2-thienylmethylpenicillin, and α-amino-3-thienylmethylpenicillin were each subjected to brief heating with potassium cyanate according to the general procedure of Example 2 to give α-ureidomethylpenicillin, α-ureido-2-furylmethylpenicillin, α-ureido-2-thienylmethylpenicillin, and α-ureido-3-thienylmethylpenicillin respectively.

I claim:
1. An α-ureidopenicillin selected from the group consisting of an acid of the formula:

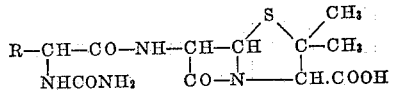

wherein R is hydrogen, phenyl, meta-hydroxy-phenyl, meta-chlorophenyl, alkyl of 1 to 6 carbon atoms, furyl or thienyl and its non-toxic salts including its sodium, potassium, calcium, aluminum and ammonium salts including non-toxic substituted ammonium salts formed with amines selected from the group consisting of tri(lower)alkylamine, procaine, dibenzylamine, N-benzylbeta-phenethylamine, 1-ephenamine, N,N'-dibenzylethylenediamine, dehydroabietylamine, N,N' - bis - dehydroabietylethylenediamine and N-(lower)alkylpiperidines.
2. α-Ureidobenzylpenicillin.
3. 6[D(—)α-ureidophenylacetamido]penicillanic acid.

References Cited

UNITED STATES PATENTS 3,120,512   2/1964   Wallhausser et al. __ 260—239.1

NICHOLAS S. RIZZO, *Primary Examiner*.